April 28, 1959 G. ROBINSON ET AL 2,883,903

DUAL CAMERA UNIT

Filed Oct. 24, 1955 4 Sheets-Sheet 1

GLEN ROBINSON
LLOYD A. DAVIES
INVENTORS

GLEN ROBINSON
LLOYD A. DAVIES
INVENTORS

April 28, 1959 G. ROBINSON ET AL 2,883,903

DUAL CAMERA UNIT

Filed Oct. 24, 1955 4 Sheets-Sheet 3

GLEN ROBINSON
LLOYD A. DAVIES
INVENTORS

April 28, 1959 G. ROBINSON ET AL 2,883,903

DUAL CAMERA UNIT

Filed Oct. 24, 1955 4 Sheets-Sheet 4

GLEN ROBINSON
LLOYD A. DAVIES
INVENTORS

United States Patent Office 2,883,903

Patented Apr. 28, 1959

2,883,903

DUAL CAMERA UNIT

Glen Robinson and Lloyd A. Davies, Pasadena, Calif. assignors to Camera Vision Productions, Inc., Beverly Hills, Calif., a corporation of Nevada Application October 24, 1955, Serial No. 542,438

12 Claims. (Cl. 88—16)

This invention is directed to a dual camera unit for producing simultaneously two images of the same subject. While various combinations of two cameras may be used, the preferred practice of the invention combines a motion picture film camera with an electronic television camera, and further provides one or more electronic viewers to duplicate the image produced in the electronic camera. In this respect, the present invention is directed to improvements over the same general type of unit disclosed in the co-pending application by Robinson and Laman, Serial No. 490,882, filed on or about February 28, 1955, and entitled Composite Electronic and Film Camera.

With both the motion picture camera and the television camera creating images of the same subject, the electronic viewer may serve as the view finder for the camera man, and if desired additional electronic viewers may serve as means remote from the two cameras for monitoring use by a director and his technical assistants. Thus, when the primary purpose is to produce a motion picture film, the apparatus serves as a highly effective production tool for saving time, for cutting costs in various ways, and for reducing the amount of discarded footage.

On the other hand, when the primary purpose of such an apparatus is to produce an electronic image, as in the production of a live television show, the motion picture camera makes it possible to produce simultaneously a motion picture film of much higher quality than can be obtained by the usual kinescope procedure. In fact, the apparatus makes it possible to produce a motion picture of such high quality that the motion picture film may be used for first class entertainment in motion picture theatres as well as for subsequent television reproduction of the same performance.

The broad object of the present practice of the invention is to correlate a motion picture camera with a television camera in such manner as to provide a unit that is highly flexible and versatile, and that may be adapted with high rapidity to the changing requirements of a continuous performance. It is further contemplated that such a unit will incorporate certain automatic features and safeguards to insure sustained quality on the part of the product, and also to minimize the possibility of breaks in continuity of imaging action.

More specific objects of the invention and especially of the preferred embodiment of the invention are to meet certain problems that are encountered in the correlation of a motion picture camera with an electronic camera for imaging the same performance in the required flexible and versatile manner. One problem, of course, is to interlock the motion picture camera with the electronic camera to function as a unit. This problem involves elimination of parallax so that the electronic image will correspond to the image produced in the motion picture camera, and also involves correlating the two cameras for synchronous focusing.

Broadly described, the present invention meets this problem by mounting two sets of lenses for the two cameras respectively on a single turret, the lenses of one set being paired with the lenses of the other, and the two matched lenses of each pair being spaced so closely together as to make parallax negligible and thus virtually eliminate this factor. Such close spacing is made possible by an arrangement in which the turret is, in effect, mounted on one camera and reflecting means is provided to divert the light beam from one lens of each pair of lenses into a second camera adjacent the turret. The reflecting means incurs a loss of light, but this loss is confined to the electronic camera and does not affect the image in the motion picture camera.

In the presently preferred practice of the invention there are two sets of three lenses each on the turret to provide three pairs of lenses for movement selectively by rotation of the turret to a pair of photographing stations for use simultaneously with the two cameras. In this regard, one specific object of the invention is to provide a single focus control for all of the lenses of both sets. Thus, the two lenses of each pair of lenses are focused simultaneously and when one pair of lenses at the pair of photographing stations is focused on a subject, the other two pairs away from the station are correspondingly focused. This arrangement eliminates any need for stopping to make a focus adjustment when the turret is rotated to change to a different pair of lenses for photographing the same subject from the same camera position. A further object is to provide a single aperture control for all of the lenses that have iris diaphragms, and at least all of the photographic lenses of the film camera will be so equipped. In the presently preferred practice of the invention both the single focus control and the single aperture control are made independent of the rotation of the turret by means of differential gearing, as will be explained.

A special object of the invention is to provide a pair of cameras correlated in this manner, in which the electronic camera has a relatively small cathode-ray tube requiring a smaller image than the image on the motion picture film. A certain problem arises here, since it is essential that the two images be identical except for size, and since, in the preferred practice of the invention, it is contemplated that the lenses of the electronic camera will have a shorter depth of field than the lenses of the film camera. The shorter depth of field makes the electronic focusing relatively critical so that the appearance of a sharp image on the electronic viewer affords full assurance that the film camera is correctly focused. This problem is further complicated, of course, by the necessity of using a reflector with the electronic camera.

In the preferred practice of the invention this problem is met by a lens system for the electronic camera in which the initial photographic lens on the turret corresponds to the photographic lens of the film camera to produce an identical image, and in which an oppositely directed pair of field lenses is combined with a final photographic lens for projecting a smaller scale image into the electronic camera. The first of the field lenses changes the divergent light beam from the first photographic lens into a beam of constant cross-section with all light paths parallel, and the second field lens again changes the character of the beam for entrance into the final photographic lens. One feature of this arrangement is that the reflecting means may be placed advantageously in the constant light beam between the two field lenses.

The various features and advantages of the invention may be understood from the following detailed description of the presently preferred embodiment of the invention, taken with the accompanying drawings.

In the drawings, which are to be regarded as merely illustrative:

*General arrangement*

Figure 2:
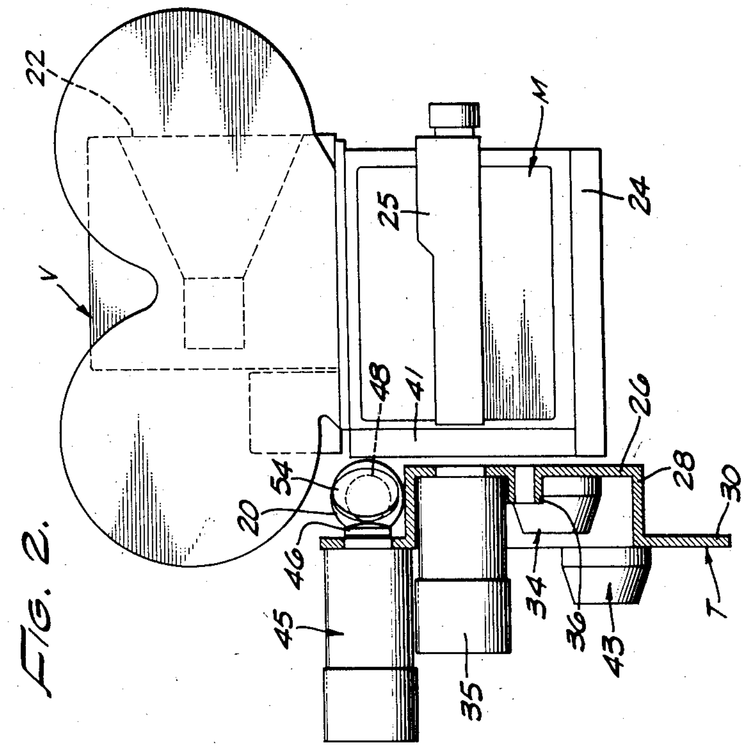
Fig. 2 is a side elevation with the turret of the unit shown in section along the line 2—2 of Fig. 1.
Figure 1:
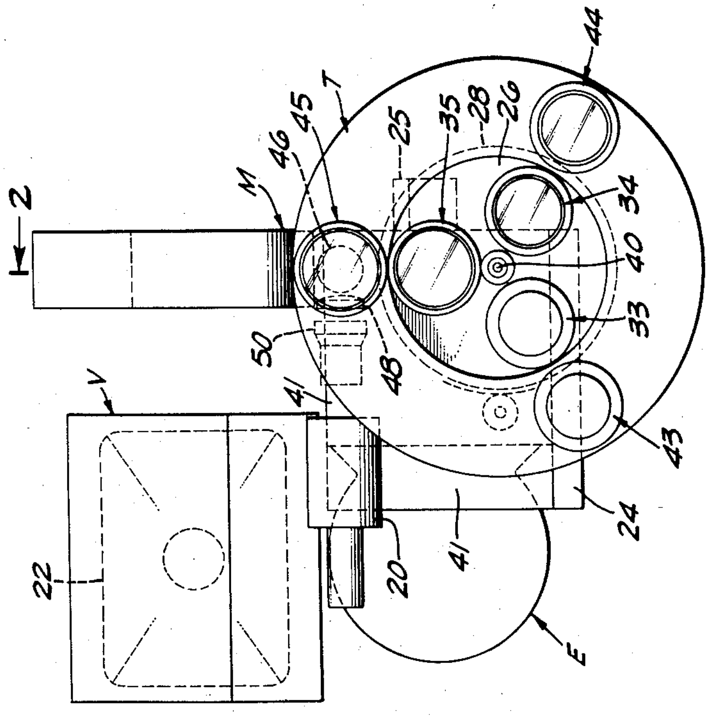
Fig. 1 is a front elevation of the presently preferred embodiment of the invention.
Figure 3:
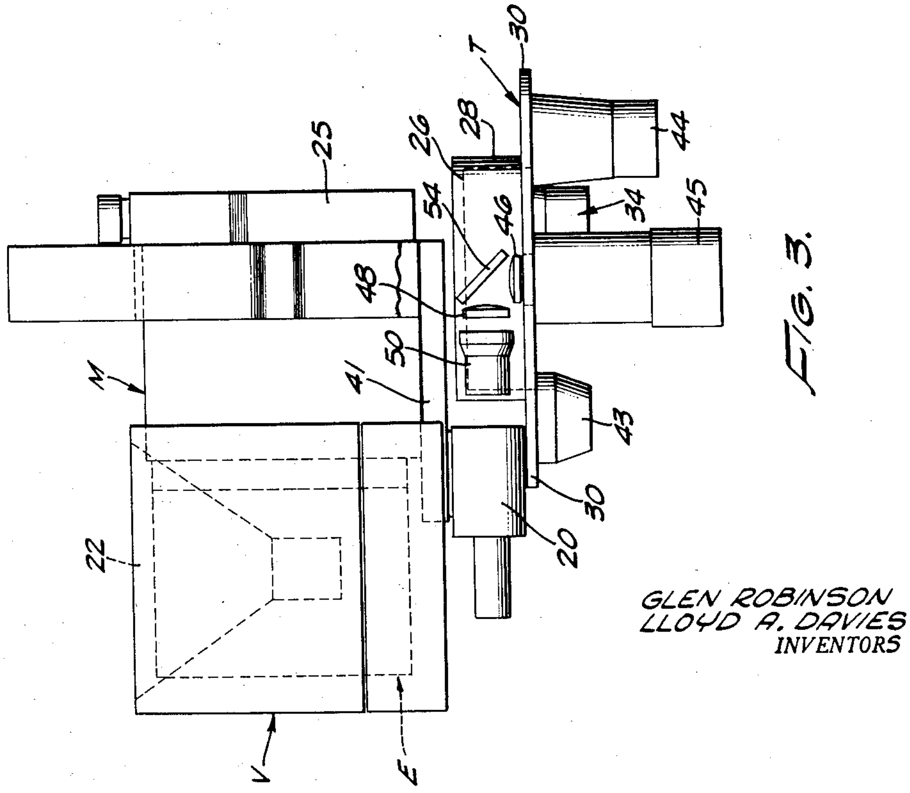
Fig. 3 is a plan view of the same embodiment of the invention.

Referring to Figs. 1, 2, and 3, the presently preferred embodiment of the invention is a unit that includes: a motion picture camera generally designated M; an electronic camera generally designated E, having a cathode ray pick-up tube 20; and an electronic viewer generally designated V, having a rearwardly directed viewing screen 22. These components may be enclosed in a common shroud or "blimp" (not shown), and may be carried by a common base structure 24. The motion picture camera M has a focusing telescope 25 which need not be used since the electronic viewer V serves the same purpose to better advantage. The motion picture focusing telescope is retained for preliminary adjustment purposes. Mounted in front of the motion picture camera M is a turret generally designated T, thru which the above focusing telescope is used when the motion picture camera is "racked over."

Figure 7:
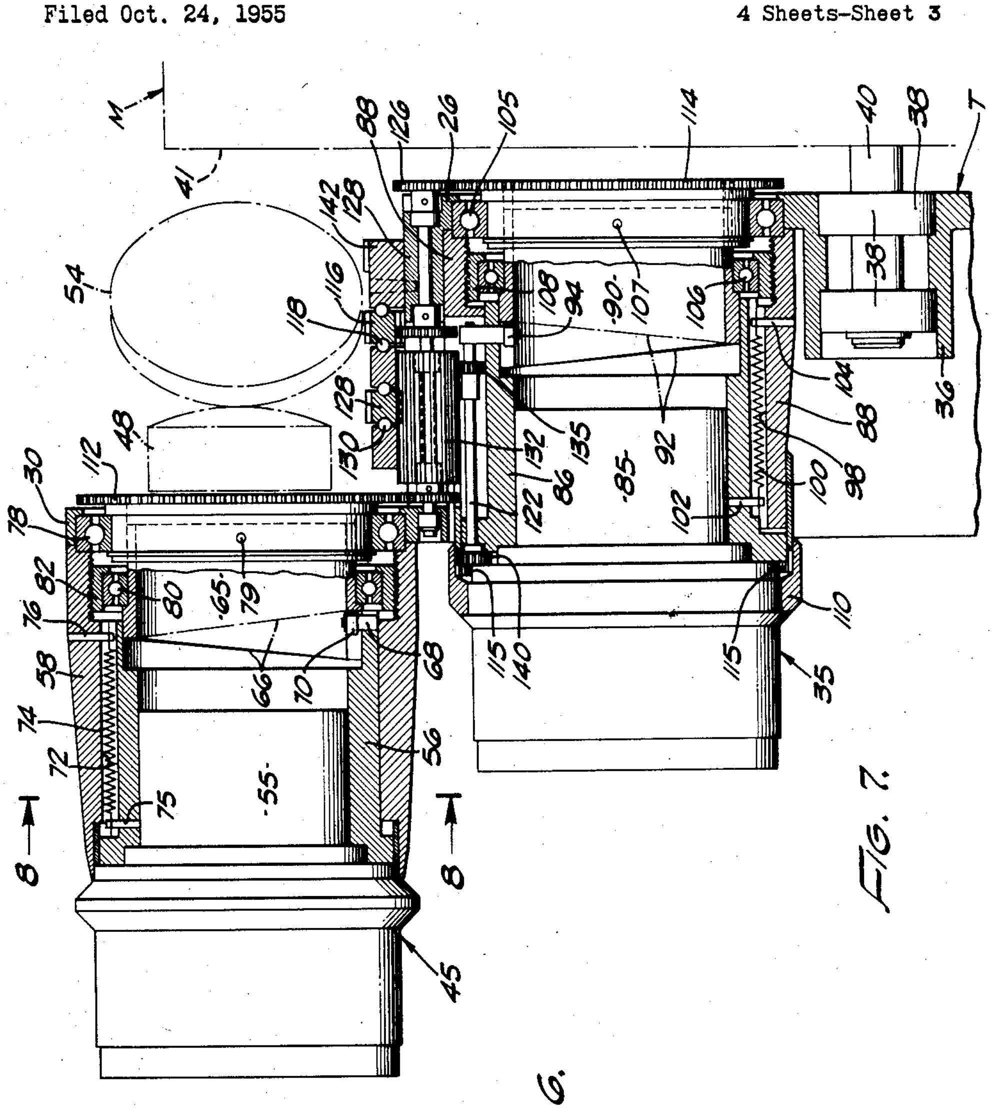
Fig. 7 is an enlarged section of the pair of lenses taken as indicated by the line 7—7 of Fig. 6.
Figure 6:
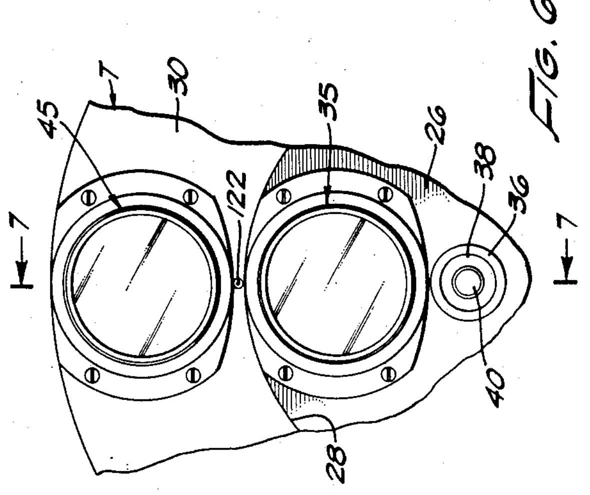
Fig. 6 is an enlarged fragment of Fig. 1 showing a pair of matched lenses on the turret in front elevation.

As best shown in Fig. 2, the turret T has a central circular disc portion 26, a forwardly extending cylindrical skirt 28 and a radial flange 30 on the forward end of the skirt. Mounted on the central disc portion 26 of the turret T are three photographic lenses 33, 34, and 35 for selective use with the motion picture camera M. Lens 33 may be a short focus wide-angle lens for shots at relatively long distance; lens 34 may be a medium focus lens of somewhat narrower angle for medium distance shots; and lens 35 may be a long focus lens for close-ups, such a lens being capable of achieving a close-up effect at a distance of several feet from the subject. The focal length of these three photographic lenses may be, respectively, 50 mm., 100 mm., and 152 mm. As shown in Figs. 6 and 7, the central disc portion 26 of the turret T may be formed with a hub 36, which hub may enclose a pair of bearings 38 by means of which the turret is journaled on a spindle 40 extending forward from a vertical turret support 41 at the front of the motion picture camera M.

The invention provides three lens systems for use selectively with the electronic camera E. The purpose of each of these three lens systems is to project onto the cathode ray pick-up tube 20 an image that is relatively small but otherwise matches the corresponding image in the motion picture camera. The three lens systems include three photographic lenses 43, 44, and 45 on the turret T that correspond with and are paired with the three motion picture camera photographic lenses 33, 34, and 35 respectively. The three photographic lenses 43, 44, and 45 match the corresponding photographic lenses 33, 34, and 35 in that they are of the same focal length and have the same angles of light admittance to form the same images. It will be noted that the photographic lenses of each matched pair are close together to reduce parallax to such a negligible degree that it may be ignored.

Figure 4:
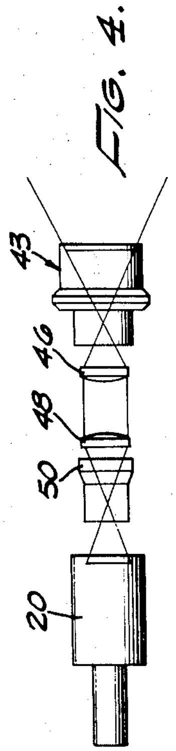
Fig. 4 is a diagrammatic representation of a lens system employed with the electronic camera.

As heretofore stated, each of the three lens systems for the electronic camera represented by the photographic lenses 43, 44, and 45 respectively, comprises a total of four lenses. For example, as shown diagrammatically in Fig. 4, the photographic short focus wide-angle lens 43 may be used in combination with two oppositely directed fast achromatic field lenses 46 and 48 together with a final short focal length photographic lens 50, the latter producing the desired smaller scale image on the cathode ray pick-up tube 20. It is to be noted that the light beam between the two field lenses 46 and 48 is of constant cross-section, and this fact makes it possible to interpose a light-reflecting device in this region for changing the direction of the light beam.

In the present embodiment of the invention the three photographic lenses 43, 44, and 45 are carried by the turret T for rotation therewith and a single field lens 46, a single mirror 54, a single field lens 48 and a single final photographic lens 50 are fixedly mounted on the turret support 41. Thus, a single set of components 46, 48, 50 and 54 is common to all three lens systems. Figs. 1, 2 and 3 show the field lens 46 that is mounted on the turret support 41 to direct the light beam onto the mirror 54 that is also mounted on the turret support at an angle of 45° relative to the axis of the two lenses 45 and 46. The second field lens 48 and the corresponding final photographic lens 50 are mounted on the turret support 41 with their axes at 45° from the face of the mirror 54. In Figs. 1, 2, and 3, the turret T is at a rotary position to place this lens system at a photographing station for projecting an image onto the cathode ray tube 20, and to place the corresponding film camera lens 35 is at a second photographing station to project a corresponding image into the motion picture camera M.

As will be explained in detail hereafter, all six of the photographic lenses 33, 34, 35, 43, 44, and 45 for picking up images of subjects are interlocked for synchronous aperture or *f* adjustment. Moreover, a control system is provided for controlling the rotary position of the turret T, the focus adjustment of the lenses and the aperture adjustment of the lenses from a remote station at the side and/or back of the unit for the convenience of the camera man. Thus, without reaching to the front of the unit, the camera man standing back of the unit and observing the electronic viewing screen 22 may adjust the lenses as desired and may rotate the turret as desired to bring the three pairs of lenses to the pair of photographing stations for use with the two cameras. A remote indicator visible from the back of the unit reveals the various adjustments to the camera man. It is apparent that in the course of photographing a given subject from a given camera position, the turret T may be rotated to bring a new pair of lenses to the pair of photographing stations without the necessity for stopping to adjust the new pair of lenses.

*Interlocking lens control mechanism on the turret*

Figure 8:
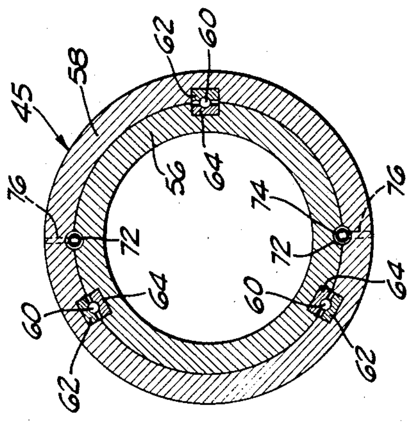
Fig. 8 is a sectional view of the electronic lens taken as indicated by the line 8—8 of Fig. 7.

As shown in Fig. 7, each of the photographic lenses 43, 44, and 45 for the electronic camera has a cylindrical lens mount 55 carried by a corresponding lens carrier 56 that is slidingly mounted in a corresponding lens housing 58. The lens housing 58 is fixedly mounted on the radial flange 30 of the turret T. As shown in Fig. 8, the lens carrier 56 is mounted in the lens housing 58 for longitudinal movement therein by means of three sets of anti-friction balls 60, each set of balls being in engagement with an outer longitudinal race 62 carried by the lens housing and an inner longitudinal race 64 mounted on the lens carrier.

Any suitable means may be provided for shifting the lens carrier 56 axially for different focus adjustments of the lens mount 55. In the present embodiment of the invention, the inner end of the lens carrier 56 telescopes over a cylindrical focus-adjustment cam 65 having a forward helical cam edge 66. The lens carrier 56 has an inwardly extending radial stud 68 which carries a follower in the form of a roller 70 positioned to ride on the cam edge 66. To hold the roller 70 against the cam the lens carrier 56 and the lens housing 58 are cut away longitudinally to form a pair of longitudinal passages 72 (Figs. 7 and 8) positioned diametrically apart, and suitable coiled springs 74 are mounted in these two passages respectively. The forward end of each spring 74 is connected to the lens carrier 56 by a stud 75, and the rearward end is connected to the lens housing 58 by a stud 76. Thus the two coiled springs 74 continuously urge the lens carrier 56 longitudinally inward to maintain the roller 70 against the helical cam edge 66, so that rotation of the cam will vary the focus of the lens. The rotary cam 65 is mounted in the lens housing 58 by a ball bearing 80, the ball bearing 80 being secured by a suitable bushing 82 that threads into the lens housing 58 for adjustment of the cylindrical focusing cam.

In like manner each of the three film camera photographic lenses 33, 34, and 35 has a lens mount 85 carried by a corresponding lens carrier 86 that is slidingly mounted in a corresponding lens housing 88. The lens housing 88 is fixedly mounted on the central disc portion of the turret. Here again the lens carrier 86 is mounted in the lens housing 88 by three longitudinal sets of balls and races as heretofore described.

Figures 9, 10:
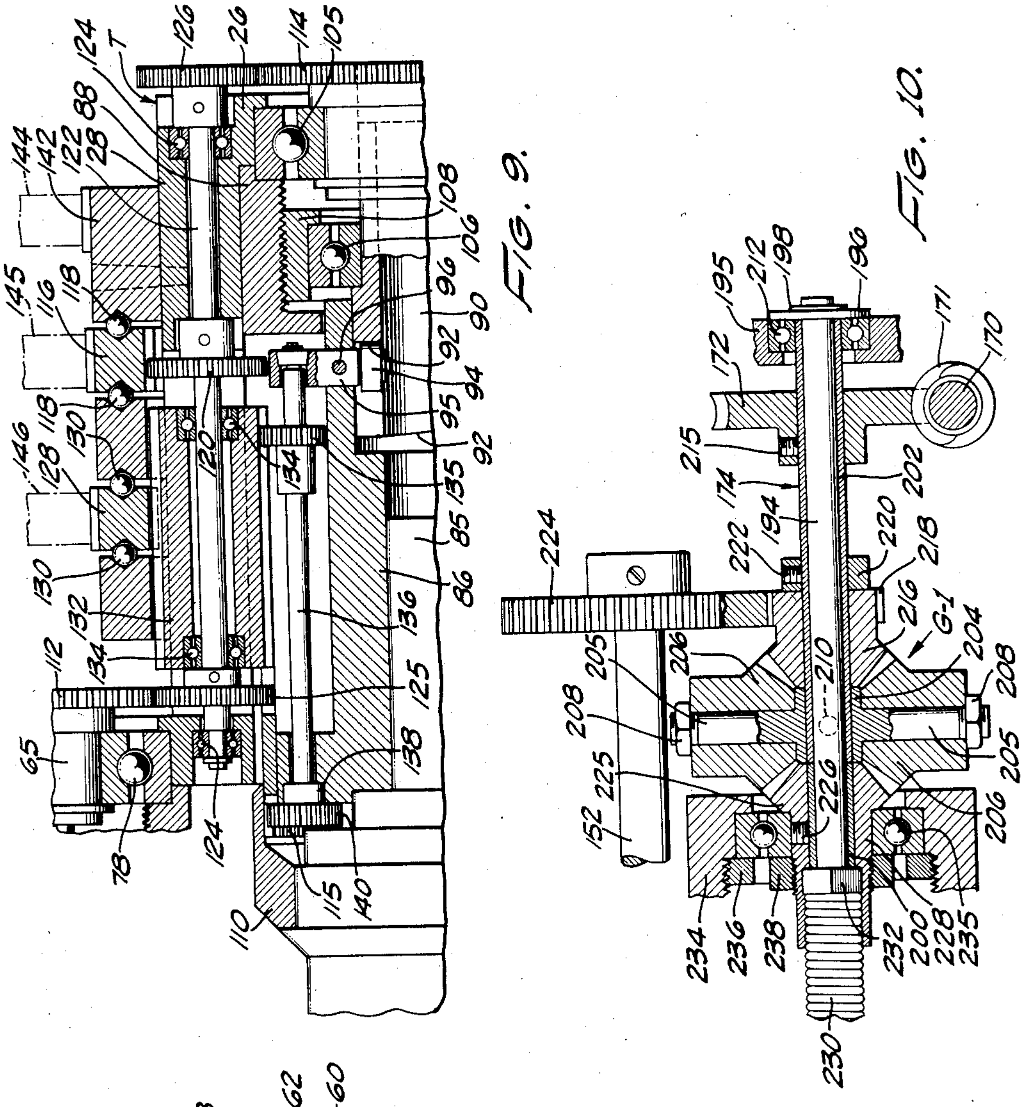
Fig. 9 is an enlarged fragment of Fig. 7.
Fig. 10 is an enlarged sectional view of a differential gear train used in the control system.

The lens carrier 86 telescopes over a cylindrical focus adjustment cam 90 having a helical cam edge 92, and a follower in the form of a roller 94 rides on this cam edge. As shown in Fig. 10, a small post 95 carries the roller 94 and extends through the wall of the lens carrier 86, the post being held in place by a screw 96. Here again the lens carrier 86 and the lens housing 88 are cut away to form a pair of longitudinal passages 98, in which corresponding coil springs 100 are mounted. Each spring 100 is connected at its forward end to the lens carrier 86 by means of a stud 102, and at its other end is connected to lens housing 88 by a stud 104. It is apparent that the two coil springs 100 will continuously position the lens carrier 86 with the roller 94 against the helical cam edge 92, and that rotation of the cylindrical cam 90 will change the focus adjustment of the motion picture camera lens. The cylindrical cam 90 is mounted in the lens housing 88 by a ball bearing 106, the ball bearing being held in position by a suitable threaded bushing 108 which provides for adjusting the cylindrical focusing cam 90.

Each of the three film camera photographic lenses 33, 34, and 35 is provided with an iris diaphragm (not shown) for aperture adjustment. The mechanism for controlling the iris diaphragm includes a rotary adjustment ring 110 that is part of the lens mount 85.

Any suitable arrangement may be employed to actuate synchronously the three cylindrical cams 65 together with the three cylindrical cams 90, and also to actuate the three aperture-adjustment rings 110 synchronously. In the present embodiment of the invention this purpose is served by providing a ring gear 112 for each of the cylindrical cams 65, a similar ring gear 114 for each of the cylindrical cams 90, and by providing each of the aperture-adjustment rings 110 with teeth 115.

Each ring gear 112 is mounted in the radial flange 30 of the turret T by a ball bearing 78 and is operatively connected to the corresponding cylindrical cam 65 by a stud 79. The stud 79 engages a longitudinal slot (not shown) in the cylindrical cam. In like manner, each ring gear 114 is mounted in the central disc portion of the turret T by a ball bearing 105 and is operatively connected to the corresponding cylindrical cam by a stud 107, the stud extending into a longitudinal slot (not shown) in the cylindrical cam.

All of the cylindrical cams 65 and 90 are controlled synchronously by a single focus-adjustment ring gear 116 having both outer circumferential teeth and inner circumferential teeth. This focus-adjustment ring gear 116 is rotatably mounted on the cylindrical skirt 28 of the turret T concentrically thereof and moves between two circumferential sets of balls 118 that ride in circumferential grooves as shown. The inner teeth of the focus-adjustment ring gear 116 mesh with three pinions 120 that are fixedly mounted, respectively, on three shafts 122. Each of the three shafts 122, which are journaled in suitable bearings 124 in the turret, carries a forward pinion 125 in mesh with the ring gear 112 that controls a rearward pinion 126 in mesh with the ring gear 114 that controls the corresponding cylindrical focus-adjustment cam 90. Thus, each of the three pinions 120 in mesh with the inner teeth of the focus-adjustment ring gear 116 controls a cylindrical cam 65 of the photographic lens for the electronic camera and synchronously controls a cylindrical cam 90 for the corresponding photographic lens of the film camera.

The iris diaphragms of the photographic lenses 33, 34 and 35 of the film camera are controlled by a single aperture adjustment ring gear 128 having both outer circumferential teeth and inner circumferential teeth. This ring gear is mounted concentrically on the cylindrical skirt 28 of the turret T and rides between two circumferential rows of balls 130. The inner teeth of the aperture-adjustment ring gear 128 are in mesh with three relatively long cylindrical gears 132 each of which is mounted by a pair of bearings 134 (Fig. 9) on the corresponding previously mentioned shaft 122 for rotation thereon independently thereof. Each of the three cylindrical gears 132 meshes with a small pinion 135 on a suitably journaled longitudinal shaft 136 carried by the corresponding lens carrier 86. It is apparent that each of the three small pinions 135 will slide along the corresponding cylindrical gear 132 in continuous mesh therewith, thus avoiding interference with focus adjustment of the corresponding film camera lens. Each of the three longitudinal shafts 136 that carries a pinion 135 also carries a second pinion 140 at its forward end, this second pinion being in mesh with the internal teeth 115 of the aperture-adjustment ring 110 of the corresponding photographic lens of the film camera. Thus, rotation of the aperture-adjustment ring gear 128 relative to the turret T will change the aperture adjustment of the three film camera photographic lenses 33, 34 and 35 synchronously.

The fixed apertures of the photographic lenses for the electronic camera are larger relatively than the largest apertures to which the photographic lenses of the motion picture camera can be adjusted. Thus, the depth of focus of the motion picture camera is always longer than the depth of focus of the electronic camera so that the appearance of a sharp image on the viewer screen 22 is assurance of a sharp image on the motion picture film.

*Remote control system for the turret and the lenses thereon*

The cylindrical skirt of the turret T carries a ring gear 142 fixedly united therewith and, as indicated by broken lines in Fig. 9, a suitable gear 144 meshes with the ring gear 142 for rotating the turret to carry the various pairs of lenses to the pair of photographing stations for use as heretofore described. In like manner, Fig. 9 shows a gear 145 in mesh with the outer circumferential teeth of the focus-adjustment ring gear 116 to vary the focus of all six of the photographic lenses and further shows how a gear 146 may mesh with the external teeth of the aperture-adjustment ring gear 128 to control the iris diaphragms of the three film camera photographic lenses 33, 34 and 35. These three gears 144, 145 and 146 may be remotely controlled in any suitable manner from the rear of the unit for the convenience of the camera man. For example, Fig. 5 shows diagrammatically a remote control system that may be used for this purpose.

Figure 5:
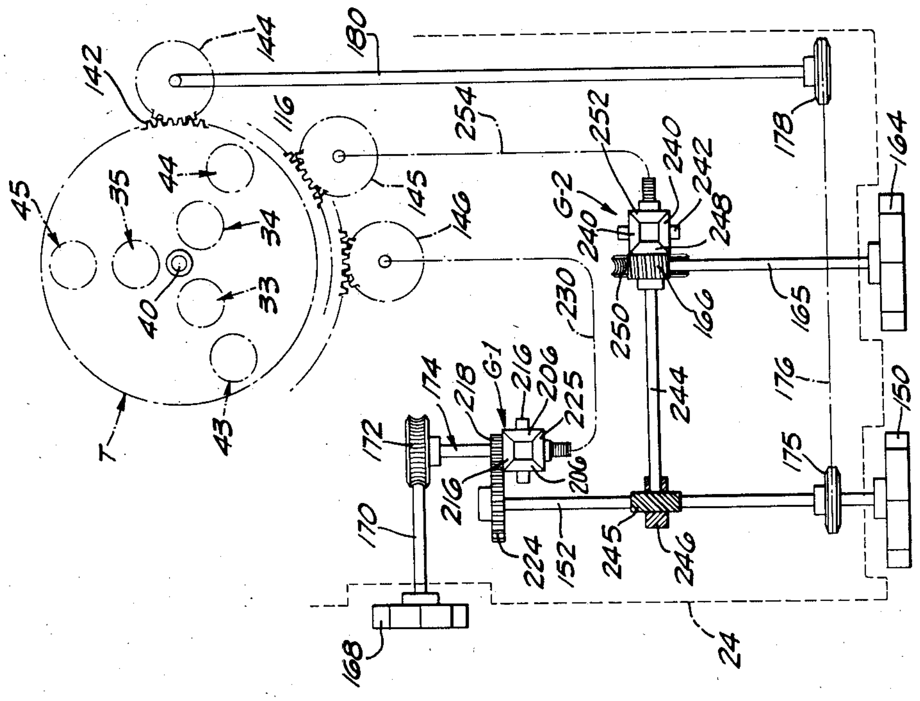
Fig. 5 is a diagrammatic representation of a remote control system for the turret and the lenses thereon.

The control system shown in Fig. 5 includes a control handle or knob 150 on the end of a suitably journaled turret-control shaft 152 and a focus-control knob 164 on a suitably journaled control shaft 165 that carries a worm 166. Also, the control system includes an aperture-control knob 168 on a shaft 170 that carries a worm 171 (Fig. 10) in mesh with a worm gear 172 on a countershaft 174. These three control knobs 150, 164 and 168 are within convenient reach of the camera man as he operates the unit to photograph a subject.

For actuation of the gear 144 that meshes with the ring gear 142 for rotation of the turret T, the control shaft 152 carries a sprocket 175, which is connected by a sprocket chain 176 with a second sprocket 178 on a countershaft 180. This countershaft 180 carries the gear 144 that meshes with the ring gear 142 on the turret T. Thus, rotation of the turret-control knob 150 causes rotation of the turret T to change the pair of lenses at the pair of photographing stations.

The turret-control shaft 152 that carries the turret-control knob 150 is connected to a differential gear train, generally designated G–1, for rotating the aperture-adjustment ring gear 128 synchronously with the turret T; and the aperture-adjustment knob 168 is operatively connected to the same differential gear train for actuation of the aperture-adjustment ring gear independently of the turret T. In like manner, the turret-control shaft 152 is operatively connected to a second differential gear train, generally designated G–2, for actuating the focus-adjustment ring gear 116 in synchronism with the turret; and the focus-control knob 164 is also operatively connected to the same differential gear train G–2 for actuating the focus-adjustment ring gear 116 independently of the turret. Since both of the differential gear trains G–1 and G–2 are of substantially the same construction, it will suffice to describe in detail the differential gear train G–1.

As shown in section in Fig. 10, the gear train G–1 is mounted on a spindle 194 that extends through a fixed support 195 and carries a washer 196 secured thereon by a split retainer ring 198. Rotatably mounted on the spindle 194 are a relatively short sleeve 200 and a relatively long sleeve 202. Keyed to the longer sleeve 202 is a differential gear spider 204 which provides two radial spindles 205. A pair of planetary bevel gears 206 are journaled on the two spindles 205 and are retained thereon by suitable nuts 208. The spider 204 is anchored to the longer sleeve 202 for rotation therewith by means of a suitable set screw 210. This longer sleeve 202, which is journaled in a suitable ball bearing 212 also carries the previously mentioned worm gear 172 that meshes with the worm 171 on the aperture-control shaft 170.

Mounted on the longer sleeve 202 for rotation independently thereof is a third bevel gear 216 that meshes with both of the planetary bevel gears 206 and is integral with a pinion 218. The combined pinion and bevel gear is held in position by a collar 220 that is retained on the sleeve 202 by a suitable set screw 222. The pinion 218 meshes with a gear 224 on the end of the previously mentioned turret-control shaft 152. Thus the bevel gear 216 and associated pinion 218 rotate independently of the longer sleeve 202, and the spider 204 carrying the two planetary bevel gears 206 rotates with the worm gear 172 that is actuated by the aperture-control knob 168.

The shorter sleeve 200 that is independently rotatable on the spindle 194 carries a fourth bevel gear 225 that meshes with both of the two planetary bevel gears 206. This fourth bevel gear 225 is keyed to the shorter sleeve 200 by a set screw 226 for rotation therewith, and has a longitudinal extension 228 by means of which it is connected to a flexible shaft 230. In the construction shown, the flexible shaft 230 terminates in a non-circular fitting 232 which is fixedly attached thereto, and is fixedly embraced by the longitudinal extension 228. As indicated in Fig. 5, the flexible cable 230 extends to the previously mentioned gear 146 that meshes with the aperture-adjustment ring gear 128 on the turret T.

A second fixed support 234 for the differential gear train G–1 carries a ball bearing 235 that rotatably surrounds the fourth bevel gear 225 and thereby supports the second end of the spindle 194. The outer race of the ball bearing 235 is secured to the fixed support 234 by means of a threaded ring 236 and the inner race of the ball bearing is secured to the bevel gear extension to 228 by means of a bushing 238 threaded thereon.

When the aperture-control knob 168 actuates the worm 171 to rotate the worm gear 172 and thereby rotate the spider 204 that carries the planetary gears 206, the bevel gear 216 is held stationary by the resistance of the previously described detent comprising the detent disc 154. Consequently the two planetary bevel gears 206 travel around the stationary bevel gear 216 and in doing so cause the fourth bevel gear 225 to rotate in the same direction at twice the rotation of the spider 204. The bevel gear 225 rotates the flexible shaft 230 to cause the gear 146 to rotate the aperture-adjustment ring gear 128 on the turret T. Thus the aperture-control knob 168 regulates the aperture adjustment of the three film camera photographic lenses 33, 34 and 35.

When rotation of the turret-control shaft 152 by the turret control handle 150 causes the gear to 224 to rotate the bevel gear 216 of the planetary gear train G–1, the spider 204 remains stationary because of the irreversability of the gear 172 in mesh with the worm 171. With the spider 204 stationary, the rotation of the bevel gear 216 causes the two planetary bevel gears 206 to rotate on stationary axes and thereby causes the bevel gear 225 and the flexible shaft 230 to rotate at the same rate as the bevel gear 126 but in the opposite direction. Thus rotation of the turret-control handle 150 not only causes the turret T to rotate, but also, acting through differential gear train G–1, causes the aperture-adjustment ring gear 128 to rotate in the same direction synchronously therewith so that the aperture adjustments of the three film camera photographic lenses 33, 34 and 35 are not disturbed by the rotation of the turret.

In like manner, the second differential gear train G–2 has a pair of planetary bevel gears 240 on a spider 242 that is directly connected to a countershaft 244. The countershaft 244 is connected to the turret-control shaft 152 by a pair of worm gears 245 and 246. A third bevel gear 248 is unitary with a worm gear 250 that meshes with the previously mentioned worm 166 controlled by the focus-control knob 164. The combined bevel gear 248 and the worm gear 250 are mounted on the countershaft 244 for rotation relative thereto. The fourth bevel gear 252 is connected to a flexible shaft 254 that actuates the previously mentioned gear 145 for controlling the focus-adjustment ring gear 116 on the turret T.

It is apparent that when the turret-control knob 150 is rotated to change the rotation of the position of the turret T, the consequent rotation of the countershaft 244 rotates the spider 242, but the bevel gear 248 will remain stationary because of the irreversability of the worm gear 250 in mesh with the worm 166. With the bevel gear 248 held stationary, rotation of the spider 242 causes the fourth bevel gear 252 to rotate at a rate to cause the focus-adjustment ring gear 116 to rotate in synchronism with the turret. On the other hand, when the focus-control knob 164 is rotated to cause rotation of the bevel gear 248, the spider 242 remains stationary because of the detent means on the shaft 152 and the resistance to rotation of the two gears 245 and 246. With the spider 242 stationary, the third bevel gear 248 acting through the two planetary gears 240 causes the fourth bevel gear 252 to rotate for actuation of the focus-adjustment ring gear 116 independently of the turret T.

The description herein in specific detail of the presently preferred practice of the invention will suggest various changes, substitutions, and other departures from our disclosure that properly lie within the spirit and scope of the appended claims.

We claim:

1. In an apparatus of the character described, the combination of: a first camera and a second camera positioned at substantially 90° relative thereto; a turret positioned in front of said first camera and to one side of said second camera; an inner circular series of lenses, and an outer circular series of lenses on said turret, each lens of one series being paired with and closely adjacent to a lens of the other series, said pairs of lenses being selectively movable by rotation of the turret to a pair of inner and outer photographing stations, said inner station being positioned to direct light from the corresponding inner lens directly into said first camera; and means to reflect all the light from the outer lenses at said outer station into said second camera.

2. An apparatus as set forth in claim 1 in which said light reflecting means comprises a single means that is fixedly mounted adjacent said turret.

3. An apparatus as set forth in claim 1 in which said outer series of lenses is offset forwardly from said inner series and said light reflecting means is positioned in the plane of said inner series of lenses.

4. An apparatus as set forth in claim 3 in which said second camera is positioned at an angle of 90° relative to said first camera.

5. In an apparatus of the character described, the combination of: a film camera; an electronic camera having a focal-plane image-receiving surface smaller than the focal-plane image-receiving surface of the film camera; a turret; a first series of photographic lenses for said film camera and a second series of photographic lenses for said electronic camera mounted on said turret, each lens of one series being paired with and closely adjacent to a lens of the other series to produce pairs of images with a negligible parallax, said pairs of photographic lenses being selectively movable by rotation of the turret to a pair of correspondingly closely spaced photographing stations comprising a first station for said first series and a second station for said second series, said first station being positioned for directing light from said first series of photographic lenses into said film camera; a first field lens fixedly mounted adjacent said turret and adjacent said second station to receive light beams from said second series of photographic lenses respectively at said second station; a second field lens fixedly mounted at an angle to said first field lens; reflecting means fixedly mounted adjacent said first field lens to direct the light from the first field lens to said second field lens; and a final photographic lens fixedly mounted in position to focus the light from said second field lens on the focal plane image-receiving surface of said electronic camera to produce an image thereon smaller than the image produced in said film camera.

6. In an apparatus of the character described, the combination of: a pair of cameras; a turret having a plurality of pairs of photographic lenses thereon movable selectively by rotation of the turret to a pair of photographing stations for projecting images into said cameras respectively, said stations and the two lenses of each pair of lenses being close together to make parallax negligible; a focus-adjustment means on said turret rotatable relative thereto to adjust the focus of all of said lenses simultaneously; an aperture-adjustment means on said turret rotatable relative thereto to adjust the apertures of at least one lens of each of said pairs of lenses; a first remote control means operatively connected to said focus-adjustment means for rotation thereof relative to the turret; a second remote control means operatively connected to said aperture-adjustment means for rotation thereof relative to the turret; and a third remote control means operatively connected with said turret and with both said focus-adjustment means and said aperture-adjustment means to rotate the turret and both said adjustment means synchronously therewith.

7. An apparatus as set forth in claim 6 which includes a first differential gear train operatively connecting said first remote control means with said focus-adjustment means and a second differential gear train operatively connecting said second remote control means with said aperture-adjustment means; and in which said third remote control means is operatively connected to both said gear trains for actuation thereof synchronously with said turret.

8. An apparatus as set forth in claim 6 which includes indicating means connected with said turret, said focus-adjustment means and said aperture-adjustment means to indicate the adjustments thereof at the location of said three remote control means.

9. An apparatus as set forth in claim 6 in which said pair of cameras comprises a motion picture camera and an electronic camera; and which includes at least one electronic viewer to reproduce the image in the electronic camera, the depth of field of the photographic lenses for the electronic camera being shorter than the depth of field of the photographic lenses for the motion picture camera whereby a sharp image on said electronic viewer is assurance of a sharp image in the motion picture camera.

10. In an apparatus of the character described, the combination of: a motion picture camera and an electronic camera; a turret positioned in front of said motion picture camera; a first plurality of photographic lenses arranged on an inner circle on said turret for projecting images into said motion picture camera; a corresponding plurality of lens systems for projecting images into said electronic camera, said lens systems including a second plurality of photographic lenses arranged on an outer circle on said turret, said plurality of lens systems being paired with said first mentioned plurality of photographic lenses for use simultaneously therewith at a pair of photographing stations at a given position of rotation of the turret, said photographic stations being spaced close together to make parallax negligible, all of said lens systems having at least one lens in common to cooperate with said second plurality of photographic lenses selectively, said common lens being fixedly mounted adjacent said turret to direct light into said electronic camera; a focus-adjustment means on said turret rotatable relative thereto to adjust the focus of said first and second pluralities of photographic lenses synchronously; an aperture-adjustment means on said turret rotatable relative thereto to adjust the apertures of said first plurality of photographic lenses synchronously; a first remote control means operatively connected to said focus-adjustment means for rotation thereof relative to the turret; a second remote control means operatively connected to said aperture-adjustment means for rotation thereof relative to the turret; and a third remote control means operatively connected with said turret, with said focus-adjustment means, and with said aperture-adjustment means to rotate the turret and said two adjustment means synchronously.

11. An apparatus as set forth in claim 10 which includes a first differential gear train operatively connecting said first remote control means with said focus-adjustment means and a second differential gear train operatively connecting said second remote control means with said aperture-adjustment means; and in which said third remote control means is operatively connected to both of said gear trains for actuation thereof synchronously there with the turret.

12. In an apparatus of the character described, the combination of: a pair of cameras; a turret having a plurality of pairs of lenses thereon movable selectively by rotation of the turret to a pair of photographing stations for projecting images into said cameras respectively, said stations and the two lenses of each pair of lenses being close together to make parallax negligible; means on said turret rotatable relative thereto for focus adjustment of all of said lenses simultaneously; a remote control means operatively connected with said rotatable means for rotation thereof from a control station separate from the turret to adjust all of said lenses simultaneously; remotely controlled turret-actuating means operatively connected both with said turret and with said rotatable means to rotate said turret for substitution of one pair of lenses for another pair at said pair of photographing stations and to rotate said rotatable means synchronously with the turret to maintain the focus adjustment of the lenses; and a differential gear train operatively connected to said rotary means, both said control means and said turret-actuating means being operatively connected to said gear train.

References Cited in the file of this patent

UNITED STATES PATENTS

| | | |
|---|---|---|
| 1,744,788 | Mery | Jan. 28, 1913 |
| 2,153,892 | Jackman | Apr. 11, 1939 |
| 2,420,197 | Rosenthal | May 6, 1947 |

FOREIGN PATENTS

| | | |
|---|---|---|
| 378,749 | Germany | July 31, 1923 |
| 731,160 | Germany | Feb. 3, 1943 |